W. D. OSBRON.
AUXILIARY CAR STEP.
APPLICATION FILED APR. 6, 1917.
1,246,780.
Patented Nov. 13, 1917.
2 SHEETS—SHEET 1.
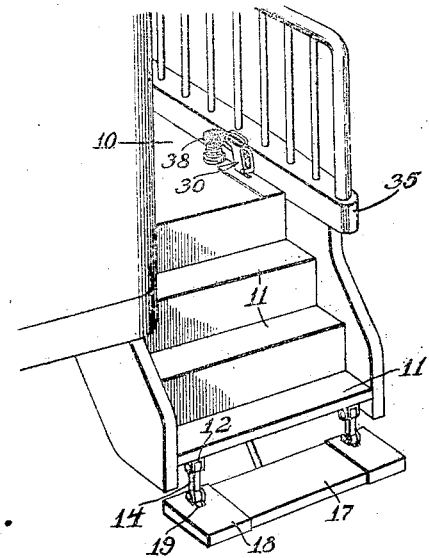
Fig. 1
Fig. 2.
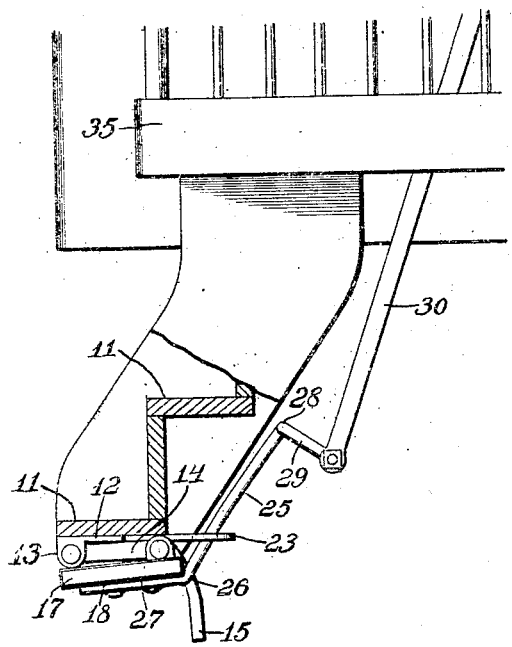
Fig. 3.
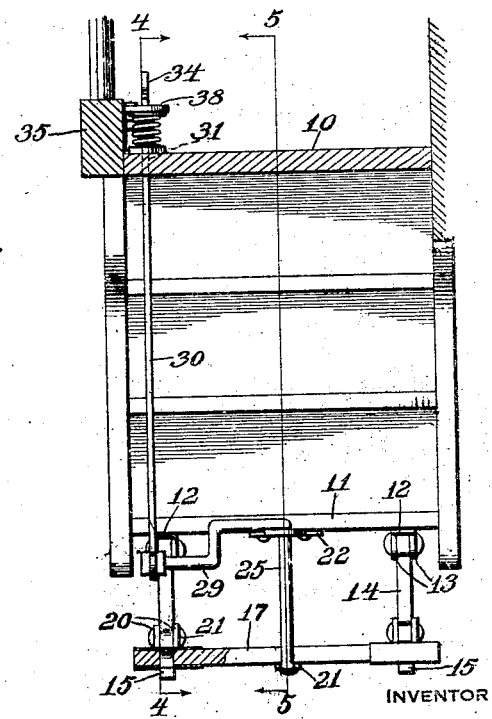
INVENTOR
William D. Osbron
WITNESS
G. E. Logan Jr.
BY Victor J. Evans
ATTORNEY

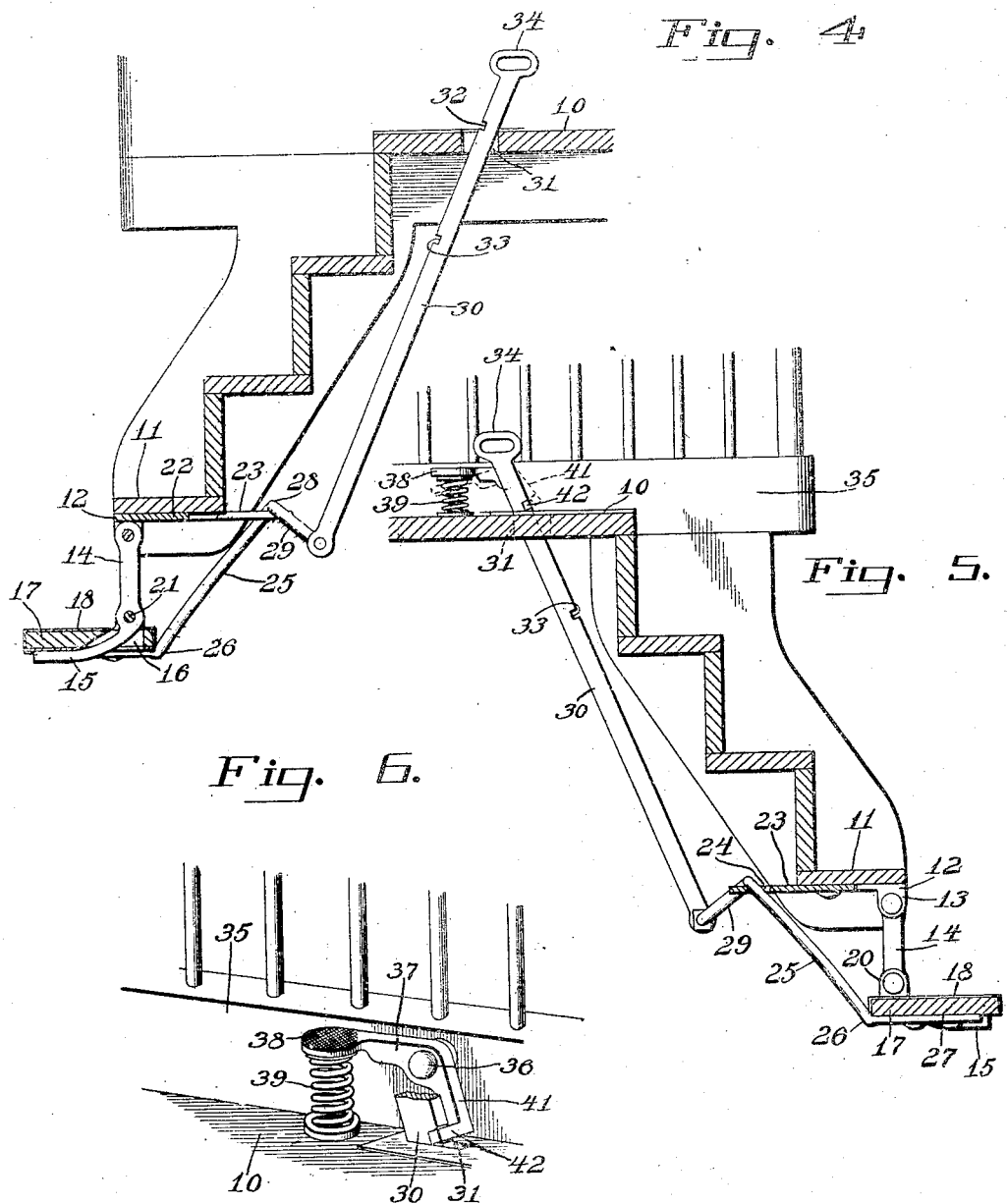

UNITED STATES PATENT OFFICE.

WILLIAM DANIEL OSBRON, OF BLYTHEVILLE, ARKANSAS.

AUXILIARY CAR-STEP.

1,246,780. Specification of Letters Patent. Patented Nov. 13, 1917.

Application filed April 6, 1917. Serial No. 160,227.

*To all whom it may concern:*

Be it known that I, WILLIAM D. OSBRON, a citizen of the United States, residing at Blytheville, in the county of Mississippi and State of Arkansas, have invented new and useful Improvements in Auxiliary Car-Steps, of which the following is a specification.

This invention relates to improvements in auxiliary car steps and has for its object to produce a step of this character which when not in use will be folded neatly against the bottom of the fixed steps, which may be locked in such elevated position against the vibrations to which the same is subjected by the travel of the train, but in which the mechanism employed for retaining the same in its elevated position may be readily actuated to permit of the gravitation of the auxiliary step to its lowered or operative position, and which while readily elevated will be effectively and rigidly sustained in its said lowered or operative position.

The invention further consists in certain novel constructions and combination of parts hereinafter described and claimed.

In the drawings:

Figure 1 is a perspective view of a portion of a car provided with the improvement, the auxiliary step being in its lowered or operative position, Fig. 2 is a side elevation, parts being broken away and parts being in section and illustrating the step in its folded or inoperative position, Fig. 3 is a rear elevation of the construction as illustrated in Fig. 2, parts being also broken away, Fig. 4 is a sectional view approximately on the line 4—4 of Fig. 3, Fig. 5 is a sectional view approximately on the line 5—5 of Fig. 3, and Fig. 6 is a perspective view of the locking means and a portion of the elevating operating bar or link engaged thereby.

Like reference characters designate similar parts throughout the several views of the drawings.

Referring now to the drawings in detail, 10 designates the platform of a car and 11 the steps leading from the said platform. To the lower face of the step 11, at a suitable distance inward of the side plates for the said steps is secured bracket members 12—12 that have their outer ends formed with depending ears 13, and between the ears of each of the brackets is pivotally secured one of the arms 14 of angular or L-shaped auxiliary step supporting members or hangers. The horizontal arms 15 of the said auxiliary step supporting members are passed through elongated openings 16 disposed adjacent to the ends of the said auxiliary step 17 and the slots 16 are preferably surrounded by metallic plates 18 that are provided with slots 19 registering with the slots 16, and the plates to the opposite sides of the said slots 19 are formed with upstanding ears 20, a pivot member 21 passing through each pair of ears and through the auxiliary step supporting members at the juncture of their vertical and horizontal arms 14 and 15 respectively. The arms 15 of the supporting members are disposed beneath the auxiliary step and are brought to contacting engagement with the said step when the latter is moved to its lowered or operative position as clearly illustrated by the drawings.

The lower of the permanent steps 11 has centrally secured upon the underface thereof a plate 22 formed with an inwardly extending reduced portion 23, the said reduced portion being provided with an elongated slot 24 through which is passed a rod member 25 that has its outer end offset, as at 26, and secured centrally to the lower face of the auxiliary step, as indicated by the characters 27. The rod 25 is designed to contact with the walls of the elongated slot 24 when the auxiliary step is in its operative position and thus assist the arms 25 in supporting and in retaining the said auxiliary step in such position. The rod 25, at a portion thereof disposed upwardly and outwardly of the extension 23 of the plate 22 is offset, as at 28, and provided with a crank portion 29. To this crank portion 29 is loosely connected the outer or lower end of an operating rod or link 30, the said link 30 passing through an elongated slot 31 in the platform 10 of the car, the said slot having a slot registering with the slot 31. The operating member or rod 30 is provided with two spaced notches 32 and 33 respectively upon one of its edges, and the outer end of the said rod is provided with a bail-shaped operating handle 34. Secured to one of the side members 35 of the platform 10 through the medium of a pivot 36 is the locking means for the rod 30. This means comprises a member 37 that has one of its ends formed with a contacting element in the nature of a button or enlargement 38, a spring 39 being disposed beneath the said enlargement and being secured to the platform 10 of the car. The member 37, at its pivotal connection 40 with the side of the car is formed with a downturned portion 41 having an offset lip 42, and this lip through the influence of the spring 39 is adapted to engage in the notch 32 when the rod member or lever 30 is in its lowered position and the auxiliary step is in its operative position, and with the notch 33 when the lever is raised to elevate the auxiliary step to its inoperative position, a pressure upon the enlarged portion of the locking member 36 will, of course, bring the lip 42 of the said locking means out of engagement with the notch 33 and the weight of the step and the mechanism connected thereto is sufficient to permit of the automatic lowering of the said step and the lip of the locking member will, of course, engage with the notch 32 when the said step is in its said lowered position, thus effectively locking the step in its lowered or operative position. The locking member may be protected in any desired or preferred manner, and the same is so arranged with respect to the operating rod or lever 30 that the said lever overlies the same when the step is in inoperative position so that the locking means will be partly hid by the said rod or lever 30 and the surreptitious actuating of the locking means will be thus reduced to a minimum.

Having thus described the invention, what I claim is:

1. The combination with a car platform and the fixed steps thereof, of brackets upon the lower fixed step, L-shaped hanger members pivotally secured to the brackets, a slotted auxiliary step receiving the lower elements of the hangers and pivotally connected with the hangers, a rod secured to the said auxiliary step, a slotted plate upon the fixed step through which a rod passes, said rod having an offset end provided with a crank portion, an operating member secured to the said crank portion and passing through a slot in the car platform, said operating rod being notched and locking mechanism arranged upon the platform and designed to engage in the notches of the rod, whereby to retain the auxiliary step in its raised or in its lowered position.

2. In combination with the platform of a car and the fixed steps for the platform, of L-shaped hangers pivotally secured to the lower of the fixed steps, a slotted auxiliary step receiving the offset arm of the hangers and pivotally connected to the said hangers, whereby the said offset arms of the hangers will contact with the underface of the auxiliary step when the latter is in its operative position, a slotted plate secured to one of the fixed steps and projecting therebeyond, a rod secured to the auxiliary step and passing through the slot of the said plate and designed to contact with the opposite walls of the said slot, said rod having a cranked end, a notched operating member connected with the said end and passing through a slot in the platform, and spring pressed means contacting with one of the edges of the operating member designed to enter the notches of said member for retaining the member in one position.

3. In combination with the platform of a car, and fixed steps therefor, of a gravity auxiliary step for the lower of the fixed steps, L-shaped hangers pivotally secured to the fixed step and passing through slots in the auxiliary step and pivotally connected to the said auxiliary step, a horizontally disposed rod secured to the auxiliary step, a slotted plate connected to one of the fixed steps and projecting rearwardly thereof through which the rod passes, and the said rod designed to contact with the opposite walls provided by the slot, said rod having a cranked end, an operating rod pivotally secured to the said cranked end and passing through a slot in the platform, a handle for the operating member, a spring pressed lock upon the platform including a pivoted member having an offset finger designed to engage with either of the notches to hold the auxiliary step in its operative or in its inoperative position, and an operating member for the lock.

In testimony whereof I affix my signature.

WILLIAM DANIEL OSBRON.

Copies of this patent may be obtained for five cents each, by addressing the "Commissioner of Patents, Washington, D. C."